4/10/84  XR  4,441,817

United States Patent [19]
Pryor

[11] 4,441,817
[45] Apr. 10, 1984

[54] ELECTRO-OPTICAL SENSORS WITH FIBER OPTIC BUNDLES

[75] Inventor: Timothy R. Pryor, Techmseh, Canada

[73] Assignee: Diffracto Ltd., Windsor, Canada

[21] Appl. No.: 173,370

[22] Filed: Jul. 29, 1980

[51] Int. Cl.³ .............................................. G01B 11/14
[52] U.S. Cl. .................................. 356/375; 356/384; 350/96.24; 250/227; 250/578
[58] Field of Search .......................... 250/227, 578; 350/96.24; 356/372, 373, 375, 376, 379, 384

[56] References Cited

U.S. PATENT DOCUMENTS

| | | | |
|---|---|---|---|
| 3,244,894 | 4/1966 | Steele et al. | 250/227 |
| 3,652,855 | 3/1972 | McIntyre et al. | 250/227 |
| 3,663,822 | 5/1972 | Uchida | 250/227 |
| 4,147,977 | 4/1979 | Dimmick | 250/227 |
| 4,150,287 | 4/1979 | Perkins | 250/227 |
| 4,287,414 | 9/1981 | Soo et al. | 250/227 |

FOREIGN PATENT DOCUMENTS

| | | | |
|---|---|---|---|
| 783524 | 9/1957 | United Kingdom | 356/375 |
| 1080726 | 8/1967 | United Kingdom | 356/375 |

OTHER PUBLICATIONS

Hamrick et al., "Optical Displacement Measuring Device", IBM Disclosure Bulletin, vol. 4, No. 7, (Dec. 1961), p. 85.

*Primary Examiner*—R. A. Rosenberger
*Attorney, Agent, or Firm*—Larson and Taylor

[57] ABSTRACT

Method and apparatus for determining physical characteristics of an object, such as its location, utilizing a non-coherent fiber optic bundle. In one embodiment, a non-coherent fiber optic bundle containing up to 30% randomly non-aligned fibers is utilized and an object is imaged onto one end of the bundle and the image is transferred from the other end of the bundle to a photodetector comprising a plurality of discrete photodetector elements. The area of the lighted or unlighted portion at the other end of the bundle is utilized to determine the physical characteristics of the object.

59 Claims, 17 Drawing Figures

VACUUM
FIG. 9a

HUMIDITY
FIG. 9b

WEIGHT
FIG. 9c

LIQUID LEVEL
FIG. 9d

TORQUE
FIG. 9e

BRAKE DISC THICKNESS
FIG. 9f

ELECTRO-OPTICAL SENSORS WITH FIBER OPTIC BUNDLES

Recent copending patent applications by the inventor (Apparatus for Determining Dimensions, U.S. Ser. No. 134,465; Method and Apparatus for Determining Physical Characteristics of Object Surfaces, U.S. Ser. No. 15,792, now U.S. Pat. No. 4,305,661; Electro-optical Inspection Ser. No. 73,226) iilustrated an optical measurement system of dimension utilizing a fiber optic based version with a coherent bundle for remoting part related edge images to a central photodetector array. In particular, this allowed one large array (linear or square), in a rugged protected housing, to service a large number of sensor locations.

This invention extends this concept considerably and in particular makes possible the use of low cost fiber optic bundles which in turn allow the construction of low cost sensor systems in numerous additional areas such as part in place sensors, limit switches, broken tool detectors, transducers of physical variables and the like.

Of key importance is not only the optical configuration described, but the use of solid state photodetector arrays coupled with microprocessor processing where required to successfully interpret the data returned by the fibers.

In the first instance, one can consider use of an area function in sensing, wherein the total area of an image or opening for example is monitored-not with a single detector, but with a scanning type detector able to measure the image area and the light intensity distribution surrounding it.

Use of an area function allows an important breakthrough in cost, namely that only an "incoherent" ie. mixed orientation fiber bundle or ribbon is required. This immediately cuts cost and allows all manner of inexpensive plastic bundles to be used, for example, the pennies per foot types used in automotive signal lamp indicators.

Of considerable interest is that I have found certain of these low cost "incoherent" fiber bundles to be, in fact, quasi coherent, ie. being able to transmit an image with only a few points out of orientation. This is an important feature to be discussed further on. It is further noted that this porperty is present in the lowest cost bundles such as the 64 strand plastic Dupon "Corfon" type. Indeed, logically the fewer the strands the more coherence and the cheapest bundles are thus most capable.

In the area only case, the matrix array is used to scan the image of the end of the bundle and determine the total light intensity, then to set up a threshold limit to count the area of dark. If area exceeds a value, the tool bit is intact. This system is immune to light level changes, fiber breakage and change in transmission due to bending, oil mist, or coolant on windows etc. (within reason), etc.

Fiber breakage actually causes a false dark spot but the random orientation tends to distribute this. Note however that if this is a problem, the measurement can be made on tool advance such that at tool full retract that total light field is on the fiber. Then a normalized area can be detected. This not only accounts for breaks, but also sets light thresholds.

For best resolution it is preferable where possible to operate this system in transmitted light. However, use of reflected light from the object is also possible. Fail-safe operation does result since fiber breaker or light source failure, obscured windows etc. results in no light returned.

New too is the use of fibers to provide the light from a central source, not only on transmission, but also in reflection where they could encircle the lens and return fiber.

As mentioned above, the invention has application to the sensing of tool diameters and lengths on machine tools, and in use on cetrain optical contact gages also disclosed in a recent patent application Ser. No. 134,465. Considering now the problem of just sensing broken tools on a machine which represents a big industrial problem, one can just monitor the area or diameter of the tool at the end or perform a coarse length check.

Several embodiments of the invention are illustrated in the drawings in which.

Figure 1:
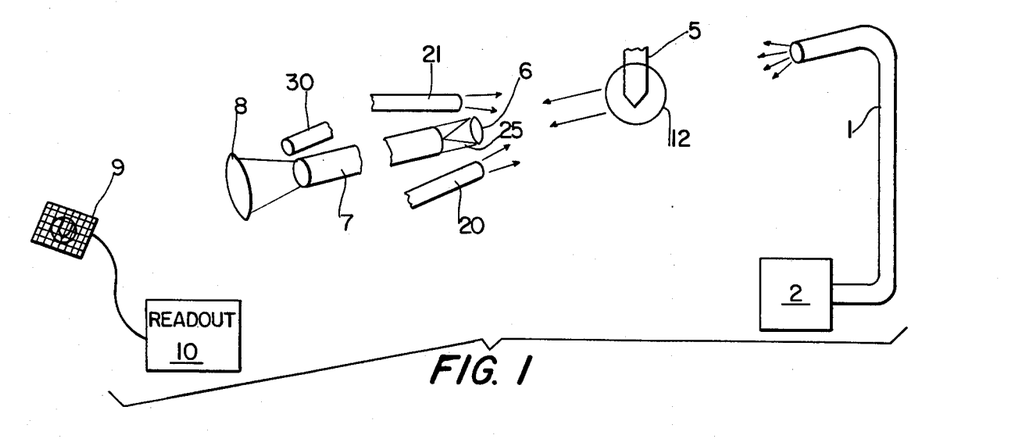
FIG. 1 is a diagrammatic view of an embodiment of the invention which utilizes a matrix detector array.

FIG. 1 illustrates the application of the invention to a broken tool detector. In this case, a fiber 1 connected to a lamp 2 illuminates a tool end 5 such as a drill or tap.

On the other side, a sensor composed of lens 6 images the broken tool onto the end of fiber optic bundle 7 which conveys it to a remote readout station where lens 8 forms the image of the other end of the fiber optic bundle onto matrix photo diode array 9 which is then read out by readout 10 generally but not necessarily containing a microcomputer.

In the operation of the invention, the area roughly illuminated by the light source fiber 1 is shown in circle 12 and it is this area of circle 12 approximately that is being imaged onto the end of the fiber 7 by lens 6 which for example is secured to the end of fiber 7 by cylindrical tube housing 25. In operation, since a total area equal to the lens angular aperture, in this particular case, or equal to any sort of aperture placed over the end of fiber optic 7 onto which the image is imaged, defines in essence the amount of light and dark in the image produced on the matrix array 9 when the array is scanned out element by element (typically such arrays may have 500 lines of 300 elements) it is seen that no matter where exactly in space the drill is relative to the axis of the sensor lens 6, the total light intensity reading, proportional to tool tip area, will be approximately the same.

If the image bundle utilized is a coherent bundle, that is where all fibers are arranged at the same location at one end as the other, the exact size of the tool end can be obtained from the image. In this example the image of the tool can be sectioned at multiple locations and its actual dimensions resolved. In this invention however the use of quasi-coherent or completely random bundles is disclosed.

However, as was mentioned above, such coherent bundles are quite expensive and it is considered an object of this invention to utilize the far cheaper and more widely obtainable incoherent or as I have found, quasi-coherent bundles. In this case the fiber arrangement is random and image points on the detector bear do not necessarily a relationship to the image at least in theory. What is of interest however is that the area of the image on matrix array 9 will be the same as that occupied by the image had their been a coherent bundle there and if area is utilized for the answer, this is all that matters.

One might ask why not just use a single detector and detect the light in the image? this is of course a valid question. However, in actual practice the ability to sense over a wide area and define an area function within it equal to that expected is important because it allows one to take out all the vagaries of the manufacturing operation which are of course considerable in this particular application in the presence of coolant etc.

In other words, by sensing the area of the tool in a larger field of view, we can sense the amount of light that is normally transmitted and set our detector gains accordingly to look for the dark areas. This is a crucial function which takes out the effects of dirty windows, the degredation of the fibers and light source etc. Naturally it also allows us to operate even though the part moves around in space relative to our sensor unit. In short all of the advantages of actually scanning the part image produced with coherent bundles exist, at least insofar as telling whether or not there is a certain area of tool at the end. In most cases this is the primary thing of interest in a machine tool environment—is the tool broken or not, which can be told from the area.

The actual reduction in cost cannot be over emphasized. The incoherent bundles can be obtained such as are commonly used in automobile signal lamps etc. are plastic and come completely prepared and automatically produced at very low cost whereas the other types of bundles are extremely expensive at this point in time (a thousand times more in some cases). Accordingly, it makes all the difference in the world as to whether or not a coherent or incoherent bundle is used since the rest of the system cost in this application would be exceeded by the coherent bundle cost if they were used (particularly over long lengths).

Figure 5:
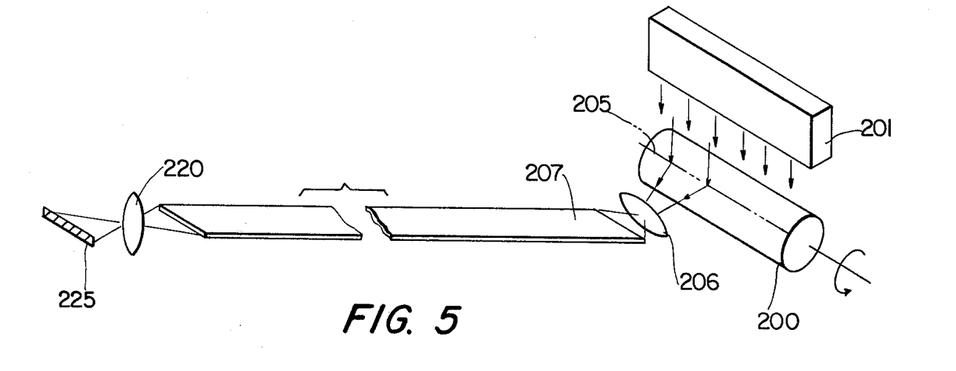
FIG. 5 is a diagrammatic view of an embodiment of the invention in which a coherent linear fiber bundle is used to sense defects on an object.

It is also within the realm of this invention, however, to consider the use of ribbon cable which is just a flat row of elements side by side in a coherent manner. This can be inexpensively made although it is not very common and therefore its price is relatively high. The ribbon does suffice to look at the image and FIG. 5 illustrates the use of such a flat ribbon cable for defect sensing. Use of this in this case of the broken tool would allow a single diameter of the tool to be measured which could be of value. It also when turned lengthwise would allow one to actually measure the length of the tool and therefore set the digital limits accordingly from the matrix diode array output as what length would be accommodated or not. While this is quite advantageous over just simply sensing an area, it should noted however that if the tool moves relative to the sensor, the length is off, whereas the area function can accommodate quite a bit of misposition. In many manufacturing environments therefore, the area function is superior anyway.

Also illustrated in the drawing is the use of secondary lighting operating reflectively such as that provided by the fibers 20 and 21 which are assumed to come from a single lamp or multiple lamps located remotely. Naturally, light sources which do not contain fibers can also be utilized if desired such as LEDs, etc. It is also within the realm of the invention to have a whole circumferential ring of fiber illuminators such as 20 and 21 encircling the housing 25. Naturally this makes a more compact package than having to have a separate light source such as, 1, on the other side of the tool.

Use of the reflected light source such as 20 and 21, also has another advantage to make up for the fact that considerably more light is generally required than in transmission. In this case the unit becomes fail safe, namely that if the tool is not present or of correct length or form, no light returns to the imaging fiber 7. Thus any kind of failure of the light source, breakage of the cable, failure of the detector, etc. all indicates that the tool's not present and the unit fail safe. This is not of course true in the other manner, wherein a good signal is actually the blockage of light. However, again the sensing of the whole area which only a portion can be blocked under any normal circumstances alleviates this problem in large measure.

Another key point of the invention is that the photo diode array which is generally expensive including its circuitry need not sense the output of a single fiber but can actually, because of its high resolution, be utilized for a large number of fibers in a given system. This is indicated by the presence of fiber 30 in FIG. 1 which can also be imaged in that sense onto the matrix array 9 by the same lens 8.

Figures 2, 3:
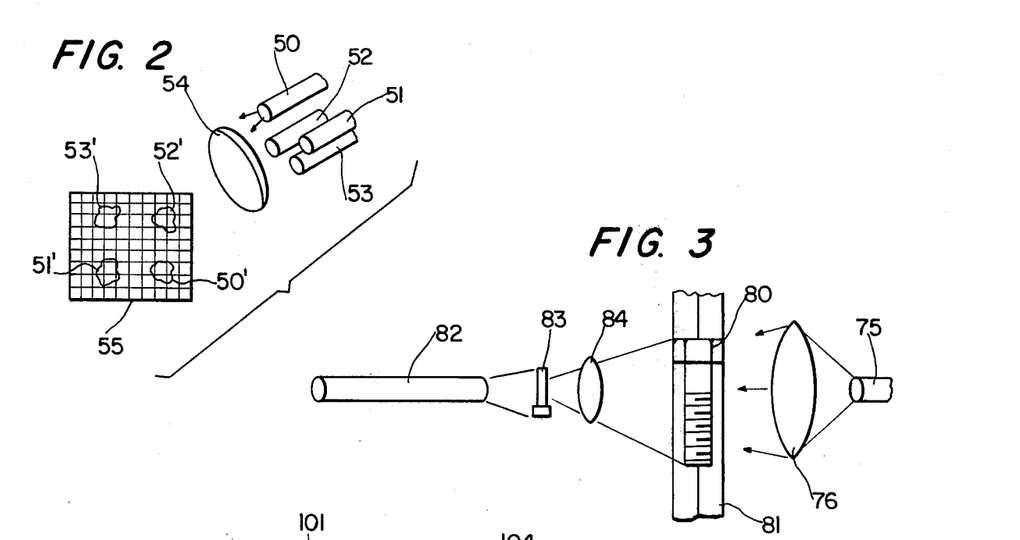
FIG. 2 is a diagrammatic view of an embodiment in which a plurality of fiber optic bundles is utilized with a single detector array.
FIG. 3 is a diagrammatic view illustrating application of the invention to sensing small parts on a machine.

This is illustrated further in FIG. 2 in which case, four fibers 50 to 53 which are assumed to come from four different tool sensing locations on the same machine such as multi spindle drill head having four drills, for example, or for that matter four different stations on a machine, each with one drill or tap etc. In this case all four are imaged by single lens 54 to form their images 50' to 53' on matrix array 55.

This matrix array then scans each of the images which is in a constant location on its surface and determines the area within each using separate thresholding of each of the signals as desired to achieve accurate measurement.

Again to describe the thresholding, one particular way is to simply just sense within the given zone of the image of let us say fiber 51, the average amount of light present. This amount of light present then is used to set a thresold value $V^T$ which in turn is then compared within that area and the number of elements darkened below a level $V^T$ is determined that is having less light on them than the $V^T$ signal out of the array. Naturally if the tool is not broken and it is set to approximately the correct length, there will be a given number of some repeating range below this level $V^T$ such as let us say 45 detector elements below $V^T$. If anything under 40 is the reject, this means that the tool is too short or broken.

The mode just described compares the light on each detector of the array to limits then sums those above or below a limit. One can also do two other modes. The first is to sum the intensity (ie. "gray level") of each detector and compare the sum to a single limit but this is quasi analog and not as desirable.

The second approach is to compare the output of each fiber of the bundle (which may fall on 20–50 detectors) to limits. This becomes quasi digital in a sense because the object location is directly digitized by the fibers (in random or quasi coherent fashion however).

The invention as described is clearly of use in detecting broken tools and has the advantage of being able to share a large number of locations via very inexpensive fibers with a single diode array chip typically of the matrix type such as the 250×250 element GE TN2500. This sharing for example on the GE array if each fiber end occupies a 50×50 element zone of the array in its image, it is clear that a 5×5 matrix of fibers can be accommodated on a single array or therefore 25 positions shared. This amounts to a very low per sensor cost.

It is clear however that the invention can be used for many other things on which area based or other simplified sensing is apropos. Immediately comes to mind another application which has many of the same requirements, namely that at a large number of positions, it is desired to see area of small parts on a machine. This is typically an assembly machine where the parts are fasteners, one channel of which is illustrated in FIG. 3.

In this case a fastener such as illuminated by light source 75, typically pulsed, and in this case an LED. A part present sensor, not shown, has triggered it at the correct location to illuminate the bolt. Lens 76 directs the light from the LED at the bolt 80 which is sliding down the track 81. The image of the bolt is formed onto the end 83 of fiber 82 by lens 84 where it is then transferred to the matrix array as shown previously.

There are several interesting points about this. First of all the fiber end of the fiber 82 has been formed into an elongate area as opposed to the nominally circular area of the fiber. This can be done very easily by simply cutting the end off the fiber together with the protective plastic coatings typically on the less expensive fibers and spreading them out into an elongate area and then holdng them together with epoxy in that form. Indeed any sort of interesting form can be formed including one shaped like a bolt for example. This is of particular interest if indeed one is looking at bolt shaped areas which is the case here. As before, one can utilize the linear area of the fiber 83 to look at the image only down the centerline of the bolt if desired or perhaps better to look at the total outline of the bolt on which the image is over illuminated such as on the circle of item 12 in FIG. 1. However, not too much over illumination is required because the part is sliding in a Vee track and is within a reasonable confinement.

It should be noted that while bolts have been shown, virtually all of the small pieces used in assembly machines, such as washers, keepers, nuts etc. can all be checked in this way and indeed such inspection can also incurr right in the feeders of such machines kicking the bad parts out by reject means not shown.

Figure 4:
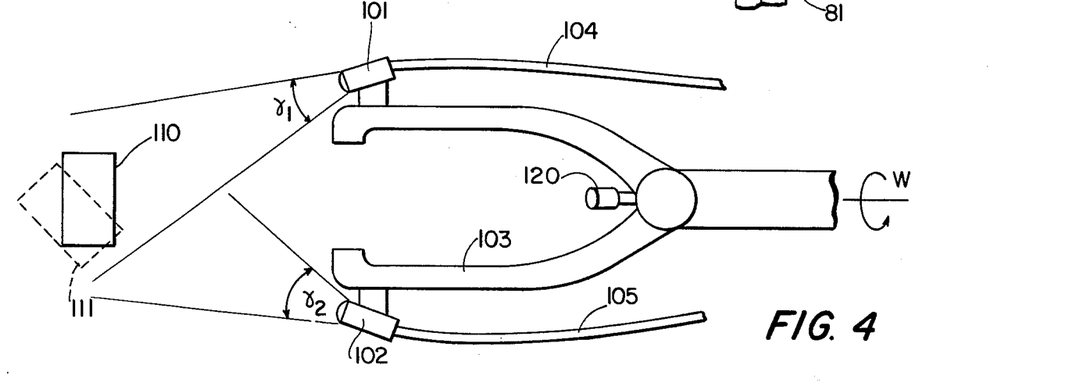
FIG. 4 is a diagrammatic view illustrating application of the invention to sensing objects to be gripped by a robot arm.

Speaking of picking parts out, one can also build an "active" feeder using such a system wherein parts that do not meet the area function are kicked back into the feeder—not because they are the wrong part, but because they are presented in such a manner that their projected area is different from the norm indicating that they are misoriented. This is another important feature of the invention namely sensing of orientation and is shown in FIG. 4. It is however, of particular interest in the feeding case as well.

Another application of a similar nature is sensing whether a part is in the correct location or attitude just before or just after an automatic assembly operation is done. The ability to build such fiber units into assembly machines at low cost allows their universal application to monitoring whether washers drop in place, whether bolts are tightened down, etc., etc.

FIG. 4 illustrates another application of the invention—this time toward a robot guidance where orientations and general part configuration areas are determined. As shown, sensors including lenses imaging onto fibers such as 101 and 102 are shown mounted to the opposite sides of a gripping hand 103 of a typical robot. The fibers 104 and 105 carry the respective area image data back to a single matrix array located romotely along the lines described above.

Each of the detectors has its field of view onto which data is sent on the fiber to the array; this being the solid angle $\gamma 1$ or $\gamma 2$. As the robot approaches a part such as 110, the area viewed of the part 110 assuming uniformity of lighting by sensors 101 and 102 is approximately the same which means that the robot is approaching the part in a more or less normal fashion as is generally desired.

If however, the part is skewed as in dotted lines 111, it is clear that the projected areas seen by detectors 101 is considerably higher than that seen by detector 102. This is immediately able to be sensed back at the matrix array and the robot motions can be adjusted accordingly so that it attempts to come in normal.

While this a relatively crude means of telling orientation, it is also extremely inexpensive and because of the sensing technology described above, virtually immune to many of the problems in plant such as dirty windows, light source, power etc. etc. This same approach either works with frontal or rear illumination of the part which has not been shown but which can be crutial. Such illumination of course in the frontal case could easily be provided as was shown relative to items 20 and 21 in FIG. 1 using a concentric ring of light for example which could be pulsed or continuous.

Another area type fiber sensor according to the invention 120 having in this case a longer focal length, which is able to view the part so as to give rough commands to the robot that at least there is a part of some area in its path. It is noted that sensors such as those described, because of their low cost, the sharing of to 25 of them for example in the manner just shown, obviously drops the cost considerably, and makes a large number of sensors available to the robot application which has not hereto fore been possible.

Let us consider this a little further. Each of the sensors is extremely small and light weight because of the possibility even of using plastic fibers. This means that no added masses of any significance are put onto the robots. Since of much of the sensing involved in robot applications is of the relatively crude variety, such sensors do provide a crude area or dimensional function in many different angles and directions without any real weight disadvantage on the robot. It's entirely possible, according to the invention, to have sensors pointing in virtually all directions of the type described and with lenses and focal lengths of different powers so as to image areas of objects both far away with some sensors near objects with others and obviously at different angles among the lot.

It is also possible according to this invention to provide a rotating sensor and this and other features here have been also discussed in a copending application (Ser. No. 262,492). In this latter case a pentaprism may be used to rotate the different images into the detector.

Another interesting thing is that typically such hands rotate around the axis of the arm as shown in FIG. 4 with the rotation angle 'W'. In this particular case, obviously the image seen by 120 would appear to rotate as it does. There is no real problem with this since the fibers can be rotated if proper stringing conditions are met. However, it is of interest in that the fiber could be stationary with simply the lens rotated and in any case it really doesn't make any difference since we are seeing areas within a circular field of view and it really doesn't make any difference whether it's rotated or not.

Shown in FIG. 5 is a different embodiment of the invention in which case a part such as roller 200 rotated about its axis is being inspected for defects according to the invention. In this case, light source 201 illuminates the roller surface and the light from a strip along the roller at any one time 205 is imaged by lens 206 onto the end of fiber ribbon 207. In this case however as mentioned above, is coherent and it transmits the image points faithfully at least within its inner fiber resolution back where it is then imaged where the other end of the fiber is then imaged by lens 220 onto in this case linear photo diode array 225.

Readout of this diode array can take place in the manner described in a copending application (Ser. No. 15,792). It can also be judged simply on an area basis to how many elements for example are dark indicating porosity pits on the surface of the roller or for that matter can be done by how many elements are light which in this case indicates that a nick is on the roller if the angle between the light source and the nick is correct. Because the fiber in this case is coherent it allows the number of contiguous dark elements to be determined which corresponds to the dark elements on the surface and thereby gives an indication of the size of defects for example. Naturally as was pointed out above, the same ribbon type coherent approach can also be used in the other embodiments above and since this is also inexpensive to produce it is considered within the area of this application to also be able to do so. It is noted that a linear array is really all that is needed if one needs a ribbon, however, if one has a plurality of ribbons they can all be scanned with a single matrix array as above with each of the ribbons stacked in rows.

Note that for many applications the ruggedness and dimensional accuracy of the diode arrays may not be required and a simple image sensor such as a Vidicon be used. The array however is preferred.

Another interesting use of such a sensor is to look at simple area type problems on parts such as flash on foundry parts such as cylinder head castings. For example, consider in the application of FIG. 4 if sensor 120 is pointed by the robot into a hole of the cylinder head casting, it can see why the area of the hole is blocked in which case it indicates that flash needs to be drilled out and the part can be grabbed then by the gripper and moved over to a grinder or drill station automatically by the robot where it is drilled. Then it can be reinspected after this has been performed.

It should also be noted that such fibers can also be used to remote X-ray data (if the ends of the fibers or other imaged surfaces are coated with suitable phosphors or other materials to convert x radiation into light). For example, where it is desired to see X-rays coming through parts for defects which are generally area functions themselves. In this case, a large number of such pick up sensors can be utilized at different critical portions on a part in an X-ray field to determine if there are defects present therein which would show up as relatively brighter areas but of course of somewhat unknown location due to quasi coherency rather than full coherency. This is crude crude but it could be quite effective and does serve to remote all the electronics etc. from the X-ray field where some harm could be obtained. The same holds true for magnetic particle inspection where black light sources are utilized.

Speaking of inspection, it should be noted that the actual use of such multi-sensor units can be of considerable advantage in inspecting certain types of parts. For example a cylinder head which after machining has a large number of holes that one would like to insure is there. This is almost the reverse case of the broken tool sensing which generally causes the problem in the first place. In this particular instance, one simply looks at each hole in a dedicated fixture with the sensor according to the invention typically one sensor per hole and scans the area. If the hole is not present, using transmitted light, there will be no light at all. Using reflected light, there'll be all light from around the hole but not from the hole. This can be very effective and is very adaptable to fixture gages for holes. It tends to take out some of the errors that have been previously noted with certain systems such as that described in copending applications (Ser. No. 64,867) where only a single detector rather than the large number here are concerned. In this case, hole presence is certainly detectable even if it is out of position. This can be good or bad of course depending on whether position is important or not but in many cases, position has not been the important factor.

It should be noted that the above concepts for many of the inspections can be done without the use of the fibers although the use of the fibers is considered to be a big advantage of the invention. One could of course have a matrix array for example for every position and at some future point if such arrays and their circuitry can be reduced in size and cost this may be quite possible and it is considered that the invention is not limited to the use of fibers to remote these to what are not high cost units.

It should be noted that this invention, while mainly useable for areas and crude image analysis (in quasi-coherent case) as well as singular line images is also of value if one is looking for particular image "signature"s. For example, what is obvious in reconsideration is that each of the sensor channels above while randomly or quasi coherent distributed in fibers is at least the same from part to part. In other words, the distribution of the fibers certainly doesn't change with each measurement cycle. This means that a certain particular signature of a good part in the field will be ascertained from the matrix array. This can be used in a variety of ways.

For example consider the broken tool case. In this case, the desired signature obtained will be that of a tool in its correct location even though the fiber areas are randomized. This signature can be memorized in the memory of the controller and used to compare the future settings of the tool. A too close comparison obviously will make the system very sensitive to alignments. However, there can easily be a happy medium in which departures too far afield are desired to be detected. This of course is particularly apropos in the sorting application since a different bolt is on each cycle, one could look for a normalized bolt area signature. This certainly does open up the fact that non standard bolts in some way or other could be detected and a simple count of the number of detectors not meeting this signature function can be provided although again correct positioning is crucial if a simple count is all that is going to be used.

Another interesting point, however, is that one is operating in reflection. If one operates in reflection, the signature is actually the reflected surface signature of the part. In other words a threaded part even though its area's the same, will have a different signature as an unthreaded part because the light from the threads is imaged in a light and dark fashion if the lighting is formed such thread shadows and this light and dark in its own random way will show up in the incoherent image. Thus it should be relatively simple to tell, for example, threaded bolts from unthreaded (an important application) in this mode of operation.

The same can hold true of looking at threaded holes in cylinder heads for example using this form of the invention and certain other signatures such as those of good parts versus bad ones ie. parts having correct washers present for example can also be judged in this manner.

It should be noted that in the broken tool application of FIG. 1, that one can also sense, via the area function, for tools of incorrect form, providing the form is sufficiently different. This helps guard against incorrect tools being used or correct over big chunks broken off.

While on the subject of form, it is also possible using the invention to check form error at multiple circumferential points by rotating the tool and flashing the light source to freeze the image at different locations. Alternatively a composite tool area can be obtained by using continuous light and rotating sufficiently rapidly such that a 360° integrated image falls on the array between scans. Since scane rate can be as low as every 0.5 seconds, this means that rates of 120 rpm or greater suffice.

Figure 6:
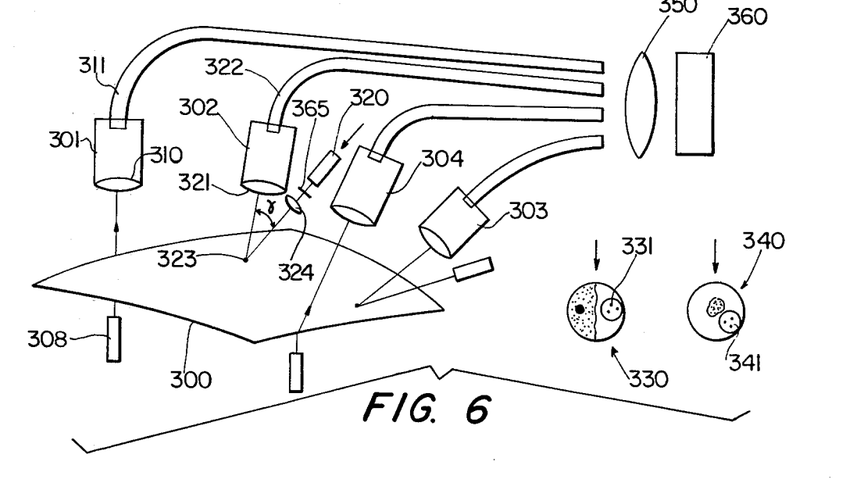
FIG. 6 is a diagrammatic view illustrating application of the invention to sensing sheet metal surfaces.

FIG. 6 illustrates another embodiment of the invention using the quasi coherent nature of commercially obtained random or incoherent bundles, to measure sheet metal panel dimensions. As in FIGS. 1-4 above the fiber bundles are assumed to be ordinary incoherent bundles, however, in this case a specific illustration is made relying on their quasi-coherent nature.

As shown, four points on the door panel 300 are monitored for position using sensors 301-304. Of course many more points can be economically so monitored, a feature of the invention.

Sensors 301 and 304 are profile types to determine the location of the edges of the panel to determine width, 302 and 303 are triangulating types used to determine contour of the panel at interior locations.

Sensor 301, for example, contains lens 310 which forms an image of the panel edge onto fiber bundle 311 using light projected by fiber end 308 from a rework light source (alternatively a local source such as a bulb, diode laser or LED can be used).

Sensor 302 forms an image using lens 321 on fiber 322 of a spot 323 projected by lens 324 using light from fiber 320. The spot image position is proportional to panel location due to the included angle γ.

As before all sensor fibers are brought to a central location and their ends imaged by lens 350 onto matrix array 360. Two of the images are shown, 330 and 340 respectively.

While 340 and 330 exhibit stray points (dots in figure) of light and dark due to the quasi coherent rather than fully coherent fiber distribution, in each case it is possible to tell where the spot or image is on the fiber face - at least to the accuracy required of the system (typically in the sheet metal case only a few thousandths of an inch.

Because of the potential of fiber randomness, it can be superior in the triangulating sensor version 302 to project not a spot, but a line or a plane of light with an edge. In this latter case, typified by the use of edge 365, backlit by fiber 320 and placed so as to be imaged onto the sheet by lens 324, the image of the edge plane of light looks just like 330, and is easier to see than a degraded spot.

In the images 330 and 340, it is of use to point out how effective mensuration can be accomplished, even in the presence of numerous false data points such as groups 331 and 341 shown, due to randomly positioned, i.e. non-coherent fibers. In the case of 330, the argument is, that we know the edge of the sheet metal is straight, and we know that the image should be straight. Since we are scanning the whole area of image, we can make a best fit to the straight line. Thus even 20-30% randomly non-aligned fibers really don't matter. In general, even the cheapest bundles aren't this bad.

In the case of 340, we can easily know the shape of the projected spot and its position is desired. However, the more general case is to simply solve for the centroid of the spot image 340, regardless of its shape and random fibers 341 and all. In this case it is only change from some master position that we are interested in anyway.

This same change argument holds true for the metal edge image 330 too, and indeed for all examples above. In the previous context, we are looking for a change in signature, in this case the same signature but with a translational movement.

The bolts of FIG. 3 can easily be measured just as the sheet metal edge of FIG. 6, similarly so can the tool bit of FIG. 1.

For the robot guidance case of FIG. 4, however, the situation with quasi coherent fibers is more difficult since one may not know apriori what the image is to be exactly. One solution therefore is to read with the matrix array the image of the fiber with various test patterns imaged on their end into a microcomputer and memorize in essense the incorrect locations and perform a coherent transformation of the data points.

Performing a transformation sounds expensive, however, with a limited number of fibers in an inexpensive quasi-coherent bundle, it is possible that only 10 positions need to be transformed. This can be relatively inexpensive.

Figure 7:
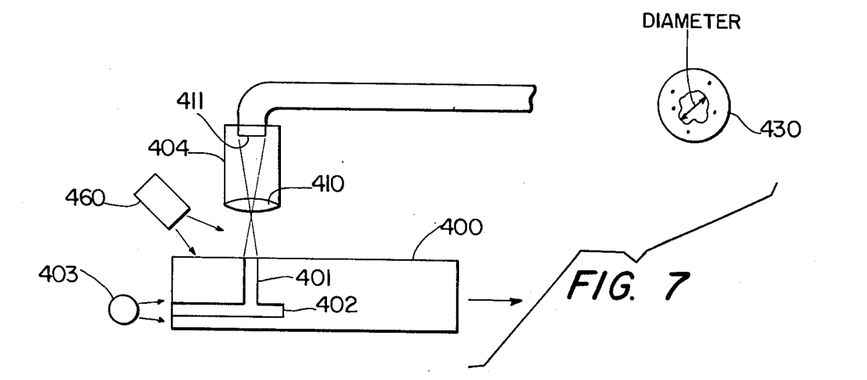
FIG. 7 is a diagrammatic view illustrating application of the invention to sensing of holes in objects.

A further illustration of the logic one can employ is shown in FIG. 7. This illustrates the use of the invention, discussed previously, to finding if holes or passages are blocked in parts such as cylinder head 400 shown.

In this case the hole 401 is determined to be through to oil gallery 402 by illuminating the gallery using light 403 and looking with sensor 404 at the hole. As before lens 410 forms an image of the hole and the area around it onto fiber end 411.

At the matrix array, we need simply look for the area of the hole formed by the light coming through. This is effective even if the head is mispositioned.

However, we can also measure the hole diameter, since we know it is basically round, and can take multiple diameters and throw out outlier points due to random fibers.

The other possibility is simply to put in a good head and memorize the signature of a good hole, for example 430 shown, including considerable random points. As in 340, the lighted area is dark in the drawing for illustration purposes (in practice it would be dark, if we illuminated the surface with reflective source 460, also a viable technique if hole presence is desired.

For best results, one would wish to read in several good heads including the tolerable misposition if any. Then a composite signature can be formed of all possible good cases from which east test can be compared.

Finally, it should be noted that the invention can be used for other than images of objects. For example, the diffraction pattern of a wire illuminated by laser light shown in a recent copending application can be projected onto such a quasi-coherent fiber bundle and very satifactorily sensed. This is doubly so because the diffraction pattern contains many fringes whose positions and spacings are all related to the wire diameter. Thus any one or two of them can be very confused by the random fibers and yet the diameter information extracted from the positions of the remaining fringes. Much the same argument holds for images of grid patterns and interference fringes.

It should be noted that the fiber bundle end does not have to be imaged onto the photo detector array. It could just be in close physical proximity with no lens employed. No real loss of resolution occurs if the least expensive fiber bundles with large fibers (e.g. 0.010" in diameter) are used. These fibers are at least 5 times the array element size.

Figure 8:
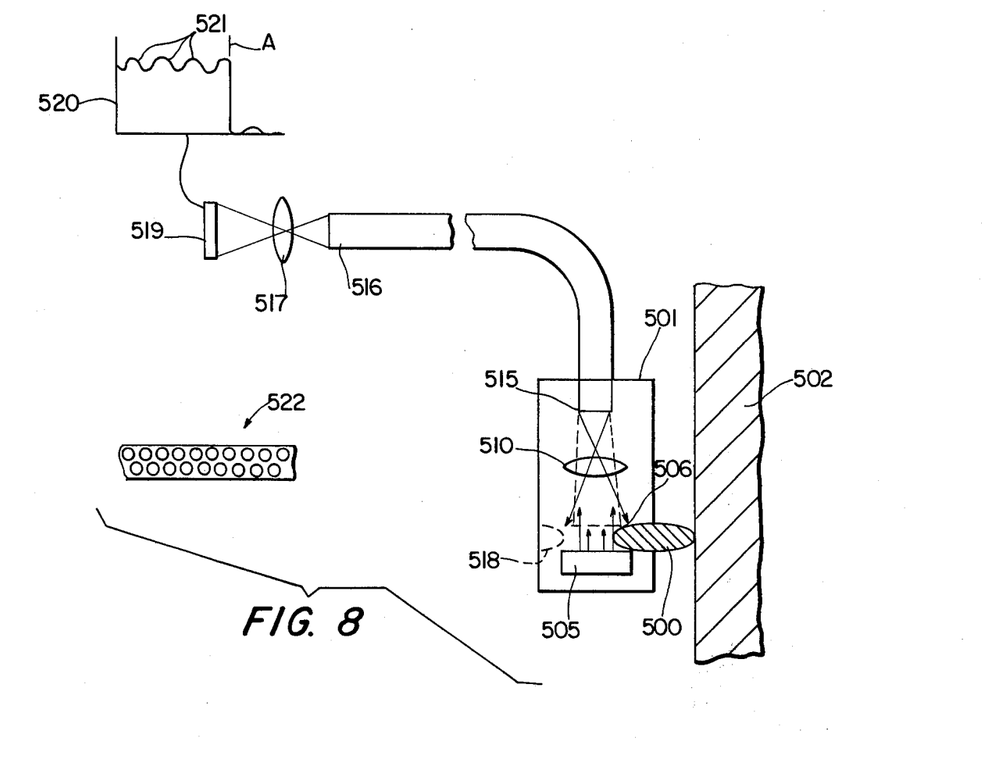
FIG. 8 is a diagrammatic view illustrating use of the invention in a contact gage.

FIG. 8 illustrates an application of the invention to part in place indicators on a machine. This version is a variation on the optical contact gage (copending application Ser. No. 134,465) employing the present invention.

Clearly one can build such a contact gage in a manner similar to that of FIG. 7, i.e. using the quasi coherent bundle and deducing where the opposite edges of the contact are from their image (or diffraction pattern).

Looking at the figure for example, we see contact member 500 moveable in housing 501 and in contact with part 502. Light source 505 illuminates the opposite edge of the contact 506 and lens 510 produces an image of 506 on fiber bundle end 515. An opposite end reference 518 may optionally be provided.

Again, this version is just like the contact gage copending application but with the extra step of using an incoherent bundle and deducing the correct edge location from the distorted image.

Consider now however the use of the invention to solve a common problem in machines, the accurate determination that a part, such as 502 is in place. For the extreme low cost required in such an application, this version will assume to operate on the area function alone using for example no lens at all, with the fiber end 515 pressed right up near the contact edge 506.

In this case a pure area function is used to determine whether or not the part is correctly located. Clearly if it is not, the contact will be in a different location and the sensed area in the array will be different. The accuracy of location determination clearly is the accuracy of area determination. This can be enhanced if the end of the bundle is spread into a "fan" (as in FIG. 5) so that small movements cause relatively discrete fiber light blockage. Indeed the extreme case is to have a fanned column of single fibers such as the ribbon of FIG. 5, but it is noted that coherent imaging is not required as the area function will yield the same answer.

However, consider now the use of a coherent ribbon which could be made from a conventional bundle, say a 16 element corfon type with the two ends 515 and 516 spread into a fan and aligned relative to each other. Lens 517 can be used to image the end of the bundle or ribbon onto a linear strip diode array 519 whose output wave form 520 is shown. Point 'A' is the point at which the edge image of contact point 506 appears. The "bumps" 521 of the trace are the individual fibers and the spaces between.

Inset 522 illustrates the alternative use of 2 coherent ribbons (as in FIG. 5) laminated together to provide higher resolution, since both can be imaged onto the same detector strip.

It is clear that this invention can be extended to limit switches of all sorts for use on machines or other purposes and that the point 506 can be on the back of a lever operated cam or any other mechanical means of transposing a position of a part machine slide etc. into a location which can be sensed.

Another application of the invention is transducers of physical variables. For example, consider the problem of monitoring automotive engine and transmission variables for use in computer controlled engine emission controls optimized for best economy. Clearly the best possible data is required, in real time, unaffected by electrical noise or heat, but at the lowest possible cost.

The invention here described can be of considerable use in this area. For example, the embodiment of FIG. 8 could be sensing the position not of a contact, but of an EGR or throttle valve for example. Clearly myriads of such sensors could be brought back to a central photodetector array unit located near the control microcomputer too. The economics are best when large numbers are used, since the most expensive element is the diode array.

Let us consider the extension of the invention then to sensing of physical variables such as pressure, torque, acceleration, force, strain, temperature, flow or the like. It is clear that specialized transducers according to the invention can be built, as will be shown in FIG. 9. In addition, image of certain features to be monitored can be utilized, such as liquid level in brake or other fluid resevoirs, brake lining thickness, control actuator positions, crank angle position, tire pressure, etc.

Several of such sensor types are shown in FIG. 9, together with different fiber and readout configurations. The latter include varying combinations of strip, area, columnar etc., fiber orientation useful at either the pickup (transducer) end or the readout (photodetector array) end. The variety is shown for illustration purposes and it is noted that any or all of the embodiments here shown can be in general interchanged in this regard without departing from the scope of the invention.

Figure 9A:
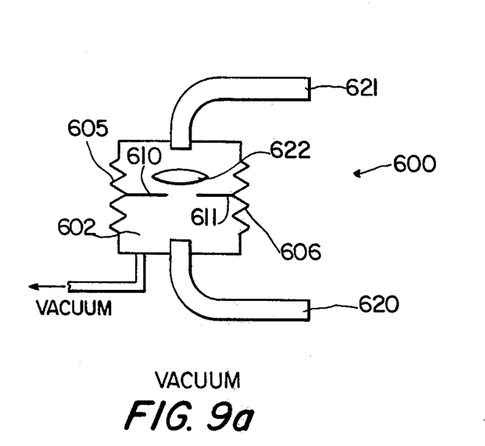
FIGS. 9a-9f are diagrammatic views illustrating application of the invention to the sensing of vacuum(a), humidity (b), weight (c), liquid level (d), torque (e), and thickness (f)

FIG. 9a first illustrates a manifold vacuum gage in which vacuum from the engine is introduced inside a chamber 602 contained by elastic members 605 and 606 having edge members 610 and 611 attached. Light from a remote light source not shown comes in via single fiber or fiber bundle 620, passes through the slit formed between edges 610 and 611 and is imaged onto the end fiber bundle 621 by lens 622. As increased vacuum is applied, the edges come close together, their image position comes closer and the area of light on the fiber end decreases. Readout can occur in any of the fashions heretofore described.

Figure 9B:
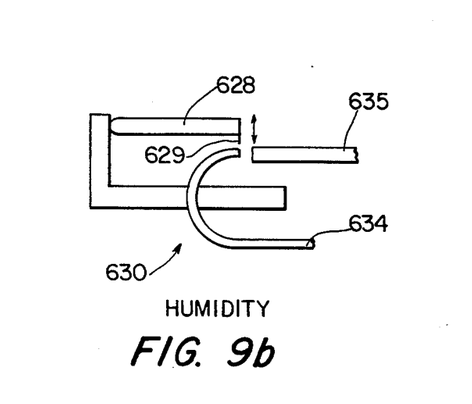

Much the same is humidity sensor 630 shown in FIG. 9b having humidity responsive element 628 (made of animal fiber for example) with edge 629 which interrupts the light from input fiber 634 passing to output fiber 635. Typically such a sensor is located in the incoming air stream to the car engine with increased humidity causing closure of the fiber light. No lens is used in this very simple example, with the fiber 635 end located instead in close proximity to the edge 629.

Figure 9C:
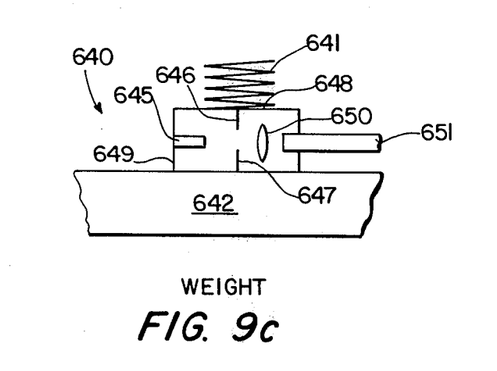

Similar too is load cell 640 shown in FIG. 9c located between spring 641 and axle 642 of a truck, to determine loading characteristics thereof. In this case, an integral LED light source 645 illuminates edges 646 and 647 attached respectively to elastic member 648 deformable under load and rigid transducer case 649. Lens 650 is used to image the edges onto fiber 651.

Figure 9D:
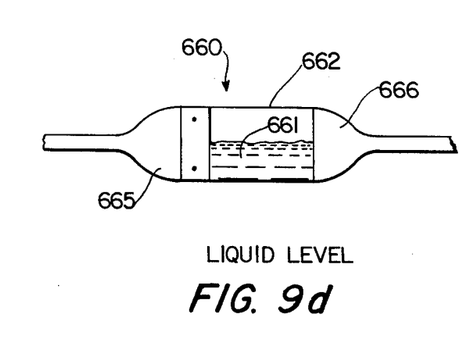

Sensor 660 shown in FIG. 9d monitors liquid level 661 as in a brake master cylinder or transmission case such as container 662 the fibers in input light fiber bundle 665 are fanned out in a column to illuminate an axial strip of the container over the zone of level interest. Similarly the fibers in output bundle 666 are so fanned as well.

Since all fibers in bundle 665 are lighted, a linear light field is then directed across the container. This field is substantially blocked by the presence of the liquid 661. Thus the number of fibers in bundle 666 receiving light is proportional to level. The fact that they are randomly mixed in orientation at the photodetector array end is irrelevant to obtaining the desired answer of liquid level.

Figure 9E:
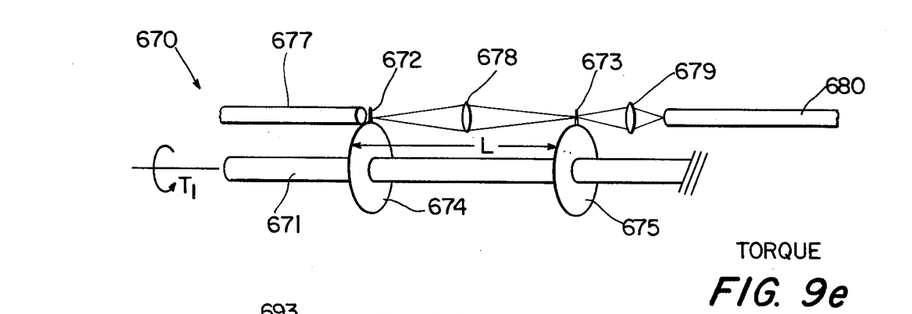

Torque sensor 670 shown in FIG. 9e, typically located in a transmission or engine output drive is very interesting. Rotating shaft 671 under torque $T_1$ twists as is well known, causing the relative angular location of edges 672 and 673 on discs 674 and 675 spaced a distance L along the shaft to change. This change, which is positive for increasing torque as shown is monitored using light from input single fiber 677 to illuminate edge 672 on a once per revolution basis. The image of edge 672 is formed by lens 678 at the plane of edge 673 where it is reimaged, together with the image of 673 by lens 679 onto output fiber bundle 680.

This torque sensor has several advantages such as extreme simplicity and no slip rings etc. and is useful for all sorts of applications including multi spindle drill heads and the like. If desired, readings of rotating torque can be provided more than once per revolution using a sequence of edges such as 672 and 673 spaced angularly (e.g. every other 20°) around the periphery of discs 674 and 675.

Figure 9F:
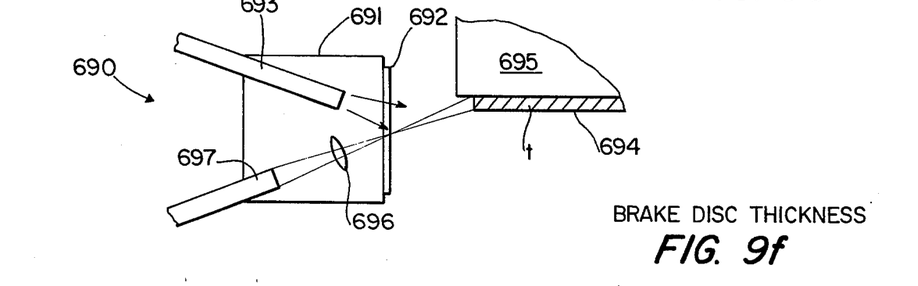

The final illustration shown in FIG. 9f is that of a brake disc lining thickness monitor 690 in housing 691 with window 692 to protect elements inside (such housing and windows are generally desirable on all embodiments, not just this one).

Fiber 693 illuminates the lining 694 on brake pad 695. Lens 696 images the lining edge so illustrated onto end of bundle 697, to allow mensuration either using the number of fibers so illuminated, real or better, the actual image position including random distortions as exist.

This disc lining monitor example is just one of many such noncontact monitoring possibilities in a car. It should also be noted, that all sensors here disclosed can be used in control application other than automotive, such as refineries etc. Further, while the main purpose here has been to show low cost examples using today's fiber bundles, the sensor elements themselves can work with coherent bundles and, in the imaging case, even waveguide image transmitting single fibers such as selfoc and the like. The latter are in fact ideal but are presently prohibitively expensive for this application.

The disc lining example of FIG. 9f is also illustrative of similar applications of the invention to monitoring of assembly variables as discussed earlier. For example, if the lining was a washer, supposedly to be installed in an assembly then a large width, or area light signal would be received by the detector (via the fiber optics). If however the washer was not present, a much reduced signal would be received.

Figure 10:
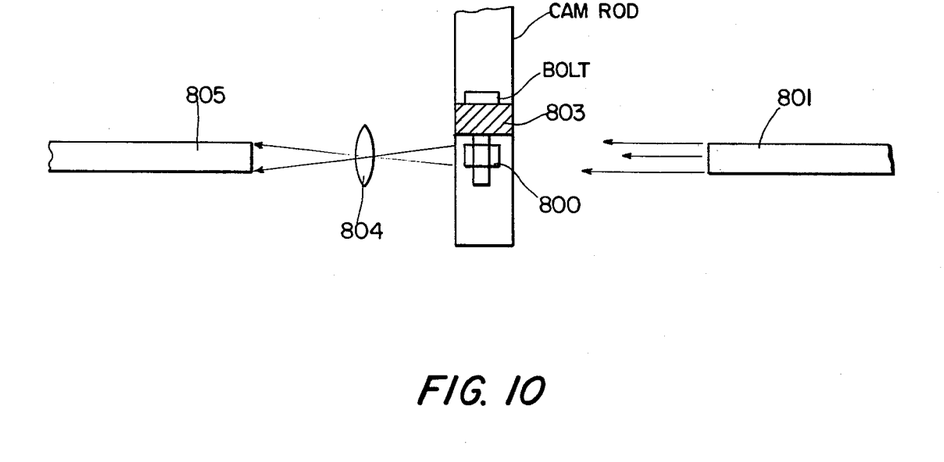
FIG. 10 is a diagrammatic view illustrating use of the invention in sensing an object which includes a nut and bolt.

The same holds true for determining whether or not a nut was put on a bolt in an assembly operation, and indeed any gaps therein can be detected via the invention. For example, consider FIG. 10, which illustrates illumination of conrod nut 800 from behind by fiber 801 rather than reflectively as in the example above. If the nut is present, a large obscuration of the light occurs, if it is not seated however (dotted lines), light passes between it and the rod face 803. This condition too is imaged by lens 804 onto the fiber bundle end 805 and can very desirably be detected either by signature analysis on truly random bundles or by looking directly at the gap if the bundle is quasi-coherent.

This same idea, whereby conditions after supposed correct assembly operations have been performed can be monitored at very low cost using reflective or transmissive images onto low cost fiber bundles of random or quasi-coherent orientation (or at extra cost, coherent ribbons or even bundles), is a significant one. Typical assembly operations on an automotive part line have tens or even hundreds of such inspections to make. These are typically not done at all now, with resulting loss of quality.

The low cost multi sensor approach of this invention creates a whole new possibility for across the board improvements in such processes. The parts monitored can be fasteners, washers, gears, circuit chips and solder joints, shims, snap rings, adhesive blobs, weld presence and a myriad of other characteristics.

The disclosed invention is notably of use sensing broken, deformed or grossly misaligned tools on machines, it is also of use in the determination of virtually any machine variable which may be converted into an image. One of these is the position of slides, normally sensed with contact limit switches but clearly applicable there via non-contact systems.

The possibility of anti-theft devices, particularly for cars according to the invention cannot be ignored as well. For example, the monitoring of a correct key "signature" can be accomplished according to the invention described above.

Figure 11:
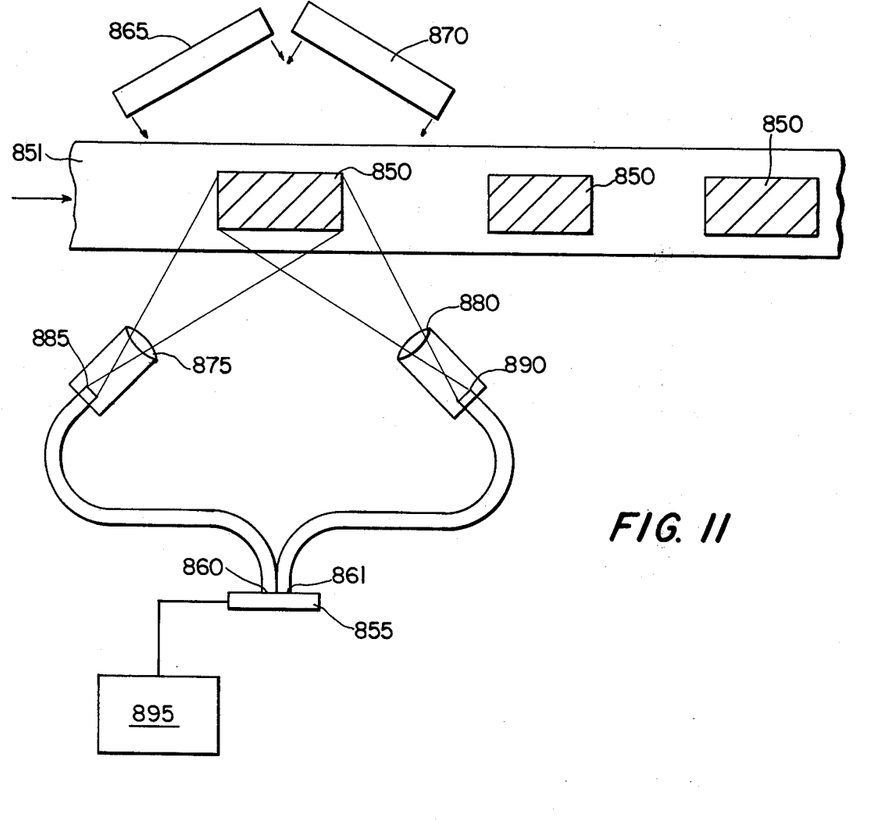
FIG. 11 is a diagrammatic view illustrating use of the invention to sense objects on a conveyor.

FIG. 11 illustrates another embodiment of the invention useful for monitoring the flow of parts 850 on a conveyor 851. It is assumed that the parts are randomly ordered but at least distinguishable from one another by their area function, or a simple dimensional function determinable from an image degraded by passage through a quasi coherent bundle.

Because of the low cost ability of the invention to monitor multiple positions from a single photodetector array, many lines or many positions on a single line can be accommodated by a single photodetector system. For example, on a GE 2500 array 250×250 elements, 100, 64 fiber bundle ends can be ideally accommodated at a ratio of 10 detector elements per fiber. As shown in the figure, in this case the array 855 is bonded to the fiber ends 860 and 861 rather than an image of the ends produced on the array. More light coupling efficiency results.

Of interest is the ability of the system to handle multiple views of an object for better identification (also of value in the robot guidance case of FIG. 4). As shown here, 2 views are used, with lighting provided by large area back lights 865 and 870, with wide angle lenses 875 and 880 imaging orthogonal views of the part 850 onto fiber ends 885 and 890.

Microcomputer 895 analyzes the data obtained in each view to determine which type of object is present and/or its orientation and position.

The invention may also be utilized for monitoring processes, such as engine valve forgoing operations where operator visualization of correct valve placement on the die is undesirable for safety reasons.

In summarizing the advantages of the invention, the primary one is again the means to allow a myriad of low cost accurate enough for the purpose, sensor units, to be provided utilizing fiber optic cable costing pennies a foot.

It is noted that many of the switching and transducer functions desired herein may also be of use in other fiber optic based control systems such as the water control as desired in a copending application (Ser. No. 29,840).

One other aspect of interest is that in cutting the ends of such low cost plastic fiber bundles (eg. corfon) one must take care not to cause a fiber rearrangement, if they are to be used in a quasi coherent manner. The mo9re fibers used, the bigger the problem.

Alternatively, one can also make use of the opportunity to rearrange the fibers at one end to cause an image coherent transmission of data entered at the other end. Particularly easy for example, is to project a test image such as a bar grid onto one end and selectively rearrange the worst outlying fibers at the other end to improve the fidelity of transmission of the bars. When optimized, one can then epoxy the fibers so they don't lose their orientation.

Of interest is that fiber bundles of corfon are often substantially of the same orientation everywhere in cable spool. Thus correction values in the microcomputer for image transformation applied to one fiber in a system, apply to al, if meeting this condition.

It is noted in the FIG. 8 example, that even if a pure area function is used, that there can be advantages in fanning the bundle elements (as shown) out into a single or double row for example to permit sensing with a linear array. Generally such arrays can operate at higher speeds than matrix arrays and can have higher light detector sensitivity. However, to accommodate large numbers of sensors the matrix is generally best as the cost per element is lowest.

It is further noted that the word "light" in the above application includes forms of electro magnetic radiation extending from the X-ray to infra-red region. Particular use is made however of the visible and near infra red portions.

It is also noted that the sensor 120 or 101, 102 in the robot application of FIG. 4 can be utilized to observe paint sprays put out by a paint gun attached to a painting robot hand. Such monitoring of the spray "fan" is desirable to assure proper operation of the system. Naturally other sensors according to the invention can also be utilized to track moving parts, locate details to be painted or masked etc.

It should also be mentioned that fiber optic sensor system of the invention can be utilized in robot control systems to transduce arm or joint positions, as well as provide limit switches etc. Use of such fiber sensors allows complete remoting of the electronic portions and can be of use in explosive environments such as munitions factories, chemical plants and the like. This holds true for all aspects of the invention (eg. assembly of munitions etc.) not just those application employing robot.

The advantage of lightness of the fiber system above lend considerably to their application to robots and the like. Application such as FIG. 4, where sensors according to the invention, in or near the actual robot gripper can sense the presense, correct position or completeness of parts before, during or after gripping can be extremely valuable. Even using them to recognize that a proper gripper has been installed is of use, as is to control the positioning of a tool gripped.

Also in the robot context, force and torque sensors such as in FIGS. 9c and 9e or part position contactors such as FIG. 8 can be used in assembly or other tasks.

Finally, the above disclosure has mainly concentrated on sensor systems which in essence "make do" with signals degraded by randomness in inexpensive fiber bundles. This is not to say however that other coherent types cannot be used, with particular emphasis here being on inexpensive ones.

For example, a coherent ribbon such as shown in FIG. 5 or 8 can be made relatively inexpensively if the number of fibers is minimized, say less that 30. For many purposes of this invention, the low resolution implied is sufficient.

Of considerable interest is the possibility of waveguide or graded index fibers, which case a single fiber can carry an image. One example is selfoc, made by Nippin Sheet Glass Corp. today it is prohibitively expensive but this may change. Any of the fiber bundles shown in this application could be replaceed by such lens-like fibers assuming proper matching lenses as required to get an image of the object in and out of the fiber onto the photodetector.

Figure 12:
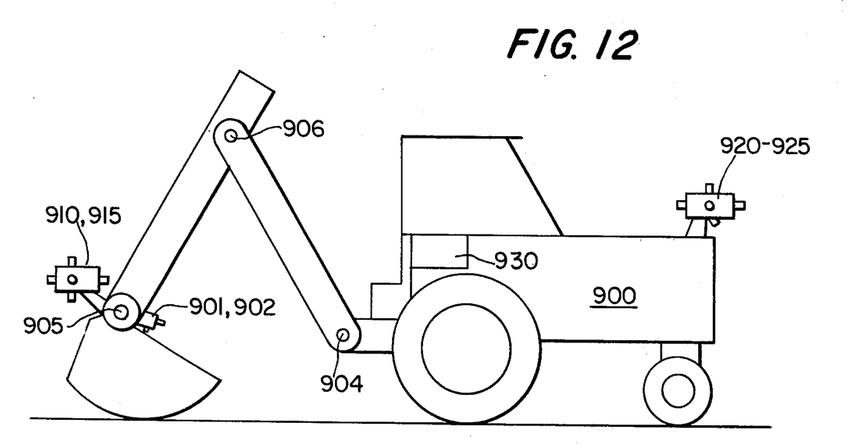
FIG. 12 is a diagrammatic view illustrating application of the invention in vehicular machinery.

The above invention has been shown to be useful for controlling robots and other machines, particularly those with a degree of flexibility in their operation. Another such application, this time to vehicular machinery, is shown in FIG. 12. In this example, motions of backhoe 900 are assisted using input from sensors according to the invention. Sensors 901 and 902 monitors images of material in the bucket while sensors 904, 905 and 906 monitor bucket and arm angular positions. Sensors 910 and 915 also mounted on the moving portions, monitor 6 axes-up, down, right side, left side, ahead, and behind the position of the moving member relative to any objects which might be in its path. An additional set of multi axis sensors 920-925 can also be used to guide forward motion as well.

All sensor data is fed via to readout unit with microcomputer 930 which can be used to guide an operator, alerting him of dangerous or inefficient conditions. In the ultimate case the provisions of such multiple sensor capability at low cost can make possible totally automatic robotic equipment of this type.

It is noted that the same type of application exists in cranes, bulldozers and other machinery of all sorts. In a more sophisticated sense one can also guide tractors in fields using the invention, with the sensors imaging corn rows, furrows etc.

Yet another application of the invention is to security systems. In this case, a home for example is "wired" using with a large number of such fibers. Moving objects, or objects matching a particular signature are flagged as potential security penetration. The low cost of the fibers allows large numbers of rooms etc. to be effectively monitored at low cost.

Note that the data transmitted via the fibers can be in the near infra red.

Insofar as the detector array is usable to a wavelength of 1.3 um or more, this allows monitoring of many IR related variables with the invention such as combustion effects in engines etc.

The invention also has the potential use of guidance of cars, trucks, and boats as well, both as operator aids to navigation, backing and other maneuvers and an actual guidance of the vehicle without operator action at all.

Sensors of this sort for example can be built into the rear fenders of cars for example to simply see if other ojects are approaching and give an approximate distance if desired. There may be many such applications in aircraft as well. Missiles too could benefit from a vastly increased number of "eyes".

Interestingly, sensors of this sort can be built into appliances as well, as in a clothes washer to see what kind and how much clothes are present or for example in a self guide vacuum cleaner. However, the main advantages result through economies of scale, ie. lots of sensors sharing one readout—which may or may not be true in this case.

This invention obviously has a myriad of potential uses, literally everywhere simple human vision or control functions are utilized. Obviously the biggerr system such as cars or large machines, offer a vast assortment of different visual, physical transducer and position related functions to be monitored—the more there are the more economical it becomes.

The fibers used herein can be layed in any fashion and can even be moldd into or extruded with the material of the structure of the machine etc. in question.

There may be many other potential applications too. Products on shelves could be monitored to check when and how they were picked off, with one sensor per bin or shelf becoming economical. Als infra red signatures in welder with fiber sensors according to the invention near the arc or spot are also of value.

Note that in the IR sensing mode, the system can be used in fire alarms to search for the typical signatures of flame and smoke images. This can actually be combined directly with the security application at no additional cost.

It should be noted that this invention is not limited to monochromatic ie. black and white images or patterns. If the photodetector used is color responsive , and the new upcoming generation of color solid state cameras is an ideal example, then all images, areas or patterns transmitted can be analyzed for their color distribution and content as well. This is particularly of interest in identifying objects whose colors may differ for example, or for coding the outputs of one sensor visa vis another by color. This allows even more fiber end images to be analyzed by a single array.

What is claimed is:

1. A method of determining the dimension, location, orientation, presence, or identity of at least a portion of an object comprising the steps of
   imaging at least a portion of an object onto an end of a non-coherent optical fiber bundle whereby the image incident on said end of said fiber bundle is transmitted to the other end thereof;
   transferring said image from said other end of said non-coherent optical fiber bundle onto a photodetector comprising a plurality of discrete photodetector elements;
   determining, from the output of said photodetector elements, the area of the lighted or unlighted portion at the other end of said non-coherent optical fiber bundle; and
   determining, from said area, said dimension, location, orientation, presence, or identity of at least said portion of said object.

2. A method according to claim 1 wherein said transferring step comprises imaging the other end of said non-coherent fiber bundle on said photodetector.

3. A method according to claim 2 wherein said photodetector comprises a solid state photodetector array.

4. A method according to claim 3 wherein said photodetector comprises a matrix array.

5. A method according to claim 1 wherein the area of the individual photodetectors making up said photodetector is less than the cross sectional area of each individual fiber in said bundle.

6. A method according to claim 5 wherein the area of an individual photodetector is not more than one fifth of the cross sectional area of said individual fiber.

7. A method according to claim 1 wherein said photodetector comprises at least 20 discrete photodetector elements.

8. A method according to claim 1 wherein said image transferring step comprises locating said photodetector in close proximity to said other end of said fiber optical bundle without the interposition of a lens therebetween, whereby the light from said other end of said non-coherent optical fiber bundle is transmitted directly thereto.

9. A method according to claim 8 wherein said photodetector is affixed to said other end of said non-coherent optical fiber bundle.

10. A method according to claim 1 wherein the fibers in either of said fiber bundle ends are arranged in at least one row.

11. A method according to claim 1 wherein said object comprises an edge and wherein said imaging step comprises imaging said edge on said end of said non-coherent fiber bundle.

12. A method according to claim 1 wherein said step of imaging comprises illuminating said object with fiber optic illuminating means.

13. A method according to claim 1 wherein said object comprises a tool.

14. A method according to claim 1 further comprising sensing the intensity of light making up said object image, and utilizing the sensed intensity to set threshold limits for determining light intensity characteristics at said other end of said non-coherent fiber bundle.

15. A method according to claim 1 further comprising detecting the intensity distribution of light at said other end of said non-coherent fiber bundle for a given object or object position, and utilizing said intensity distribution at a later time to determine if said given object or object portion is present.

16. A method according to claim 1 further comprising contacting said object and a part at a point and utilizing the position of another point of said object to determine the dimension or location of said part.

17. A method according to claim 1 wherein said imaging step comprises providing a plurality of images of said object onto said end of said non-coherent fiber bundle.

18. A method according to claim 1 further comprising pulsing a light to freeze said image of said object.

19. A method according to claim 1 wherein said object is among a plurality of objects in a feed track, wherein orientation of said objects in said feed track is determined, and further comprising directing mis-oriented objects to a reservoir for reintroduction into said feed track.

20. A method according to claim 1 wherein said fiber bundle is a plastic type.

21. A method according to claim 1 wherein said object has one or more holes.

22. A method according to claim 1 wherein said object is threaded.

23. A method according to claim 1 wherein said imaging comprises illuminating said object with reflected light and imaging with a lens and wherein the axis of illuminating light is disposed at an angle with respect to the lens axis, and wherein said method includes the further step of determining the proximity of said object relative to said lens or to a light source used for illuminating.

24. A method according to claim 1 wherein repeated images of different objects or positions of the same object are memorized.

25. A method according to claim 24 wherein the object is at least one test pattern.

26. A method according to claim 1 wherein the ends of the fibers at one or both ends of said bundle are in alignment.

27. A method according to claim 1 wherein said fiber bundle is in the form of a ribbon comprising a row of fibers.

28. A method according to claim 27 wherein said fiber bundle comprises a plurality of said ribbons laminated together.

29. A method according to claim 1 wherein said fiber bundle comprises a plurality of discrete fiber bundles.

30. A method according to claim 1 further comprising utilizing said determined dimension, location, presence or identity to control a machine.

31. A method according to claim 1 wherein said object comprises a liquid spray.

32. A method according to claim 1 wherein said object comprises an intruder, a flame or smoke in a monitored zone.

33. A method according to claim 1 wherein said end of said fiber optic bundle is mounted on a gripper or arm of a robot.

34. Apparatus for determining the dimension, location, orientation, presence or identiy of at least a portion of an object comprising;
    means for imaging at least a portion of an object onto an end of a non-coherent optical fiber bundle whereby the image incident on said end of said fiber bundle is transmitted to the other end thereof;
    means for transferring said image from said other end of said non-coherent optical fiber bundle onto a photodetector comprising a plurality of discrete photodetector elements;
    means for determining, from the output of said photodetector elements, the area of the lighted or unlighted portion at the other end of said non-coherent optical fiber bundle; and
    means for determining, from said area, said dimension, location, orientation, presence or identity of at least said portion of said object.

35. Apparatus according to claim 34 wherein said image transferring means comprises means for imaging the other end of said non-coherent fiber bundle on said photodetector.

36. Apparatus according to claim 35 wherein said photodetector comprises a solid state photodetector array.

37. Apparatus according to claim 36 wherein said photodetector comprises a matrix array.

38. Apparatus according to claim 34 wherein the area of the individual photodetectors making up said photodetector is less than the cross sectional area of each individual fiber in said bundle.

39. Apparatus according to claim 38 wherein the area of an individual photodetector is not more than one-fifth of the cross sectional area of said individual fiber.

40. Apparatus according to claim 34 wherein said photodetector comprises at least 20 discrete photodetector elements.

41. Apparatus according to claim 34 wherein said image transferring means comprising means for locating said photodetector in close proximity to said other end of said fiber optical bundle without the interposition of a lens therebetween, whereby the light from said other end of said noncoherent optical fiber bundle is transmitted directly thereto.

42. Apparatus according to claim 41 wherein said photodetector is affixed to said other end of said non-coherent optical fiber bundle.

43. Apparatus according to claim 34 wherein the fibers in either of said fiber bundle ends are arranged in at least one row.

44. Apparatus according to claim 34 wherein said object comprises an edge and wherein said imaging means comprises means for imaging said edge on said end of said non-coherent fiber bundle.

45. Apparatus according to claim 34 wherein said means for imaging comprises fiber optic means for illuminating said object.

46. Apparatus according to claim 34 further comprising means for sensing the intensity of light making up said object image, and means for utilizing the sensed intensity to set threshold limits for determining light intensity characteristics at both ends of said non-coherent fiber bundle.

47. Apparatus according to claim 34 further comprising means for detecting the intensity distribution of light at said other end of said non-coherent fiber bundle for a given object or object position, and means for utilizing said intensity distribution at a later time to determine if said given object or object portion is present.

48. Apparatus according to claim 34 wherein said imaging means comprises providing a plurality of images of said object onto said end of said non-coherent fiber bundle.

49. Apparatus according to claim 34 further comprising means for pulsing a light to freeze said image of said object.

50. Apparatus according to claim 34 further comprising feed track means for feeding a plurality of objects, wherein said determining means comprises means for determining orientation of an object in said feed track, and further comprising means for directing mis-oriented objects to a reservoir for reintroduction into said feed track.

51. Apparatus according to claim 34 wherein said fiber bundle is a plastic type.

52. Apparatus according to claim 34 further comprising means for memorizing repeated images of different objects or of different positions of the same object.

53. Apparatus according to claim 34 wherein the ends of the fibers at one or both ends of said fiber bundle are in alignment.

54. Apparatus according to claim 34 wherein said fiber bundle is in the form of a ribbon comprising a row of fibers.

55. Apparatus according to claim 105 wherein said fiber bundle comprises a plurality of said ribbons laminated together.

56. Apparatus according to claim 34 wherein said fiber bundle comprises a plurality of discrete fiber bundles.

57. Apparatus according to claim 34 further comprising means for utilizing said determined dimension, location, presence or identity to control a machine.

58. Apparatus according to claim 34 wherein said end of said fiber optic bundle is mounted on a gripper or arm of a robot.

59. Apparatus according to claim 34 wherein said means for determining said object dimension, location, orientation, presence, or identity comprises a microcomputer.

* * * * *